(12) United States Patent
Hedenskog et al.

(10) Patent No.: US 6,373,727 B1
(45) Date of Patent: Apr. 16, 2002

(54) SYNCHRONOUS RECTIFICATION IN A FLYBACK CONVERTER

(75) Inventors: Bo Hedenskog, Jarfalla; Andréas Svensson, Tumba, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/801,879

(22) Filed: Mar. 9, 2001

(30) Foreign Application Priority Data

Mar. 10, 2000 (SE) .............................................. 0000759

(51) Int. Cl.[7] .............................................. H02M 3/335
(52) U.S. Cl. ...................................... 363/21.14; 363/97
(58) Field of Search ........................ 363/16, 20, 21.06, 363/21.12, 21.14, 21.15, 21.18, 97

(56) References Cited

U.S. PATENT DOCUMENTS

| | | | |
|---|---|---|---|
| 4,423,341 A | 12/1983 | Shelly | 307/570 |
| 5,019,719 A | 5/1991 | King | 307/246 |
| 5,594,629 A | 1/1997 | Steigerwald | 363/21 |
| 5,999,420 A | 12/1999 | Aonuma et al. | 363/21 |
| 6,061,255 A * | 5/2000 | Chik et al. | 363/21.06 |
| 6,198,638 B1 * | 3/2001 | Lee | 363/20 |

* cited by examiner

*Primary Examiner*—Jessica Han
(74) *Attorney, Agent, or Firm*—Nixon & Vanderhye, P.C.

(57) ABSTRACT

A flyback converter has a primary side including a main switch and a control device and a delay circuit. The converter has a secondary side including a drive circuit controlling a rectifying switch. The drive circuit has a first part including a first transistor, a first discharge diode and an on-node and a second part including a second transistor, a second discharge diode and an off-node. The control device is connected to the drive circuit via at least one drive capacitor to the on- and off-nodes. The control device issues drive pulses to the main switch through the delay circuit and to the drive circuit. The drive circuit has a first mode of operation in a flyback phase, which is triggered when the main switch is turned off and the rectifying switch is rendered conducting. A second mode of operation is a forward phase, which is triggered when the main switch is turned on and the rectifying switch is rendered nonconducting. The flyback converter includes few components and the main switch is efficiently prevented from conducting simultaneously with the rectifying switch.

9 Claims, 2 Drawing Sheets

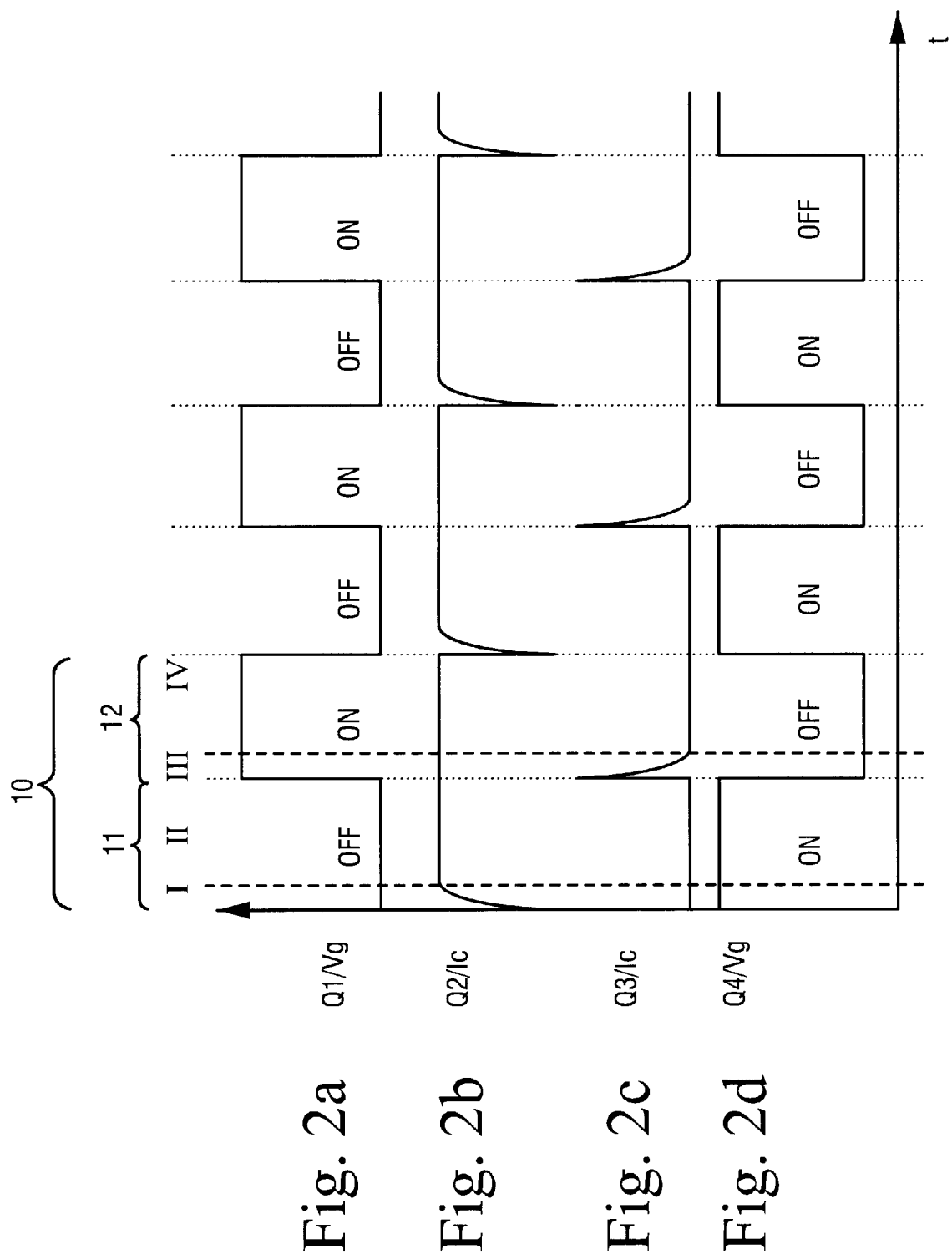

SYNCHRONOUS RECTIFICATION IN A FLYBACK CONVERTER

The present invention relates to a DC-to-DC converter circuit and in particular to a synchronous flyback converter circuit for operation in a continuous mode.

BACKGROUND

In DC-to-DC power supplies for different kinds of electrical devices, power rectifiers are utilised in order to obtain a rectified output voltage. Typically, a diode would be employed on the secondary side in order to obtain the rectified output voltage.

A DC-to-DC converter is described in U.S. Pat. No. 5,886,881 for Xia et. al. The forward DC-to-DC converter described can be used to carry out synchronous rectification and zero voltage switching. This circuit is only intended for forward and forward derived converters and is not applicable to flyback converters.

Another DC-to-DC converter is described in U.S. Pat. No. 5,726,869 for Yamashita et. al A synchronous rectifier type forward DC-to-DC converter is disclosed that is capable of preventing an increase in losses occurring when a synchronous rectification switch and a flywheel synchronous rectification switch is conducting simultaneously, or when the synchronous rectification switch is conducting simultaneously as a primary side switch.

If these secondary side switches, which are responsible for rectification on the secondary side of the transformer, are turned on simultaneously, a risk exists of destroying FETs or windings due to large currents. The cross-conduction of the switches is here prevented by physical components, such as the saturable cores, causing some increase of power losses and an increased physical size of the converter.

Another way to design a suitable rectifier circuit is to use flyback topology. In a converter using flyback topology, a primary side stores magnetic energy in an air gap of a magnetic core, or the like, during a charging interval. The energy is then fed to a secondary side during the so called flyback interval. The main advantage of a power converter circuit employing a flyback topology compared to other converter circuits is the simple construction thereof, which makes the cost of manufacturing it low.

A conventional flyback converter comprises, on the primary side, a primary winding of a transformer and a switch, and on the secondary side, a secondary winding of the transformer connected to a diode and an output capacitor over which a load can be connected.

Such a converter has a large voltage drop over the diode. When the output voltage over the output capacitor is low, the voltage drop over the diode becomes a significant part of the overall voltage, which makes the power converter inefficient for such low voltage applications.

The continuously increasing demand to minimise the size of flyback converters, regardless of power class, intensifies the demand on the efficiency of the converters. The efficiency sets the limit of the power that can be converted in a small space in which heating must be kept at a permissible level. The voltage drop in a Schottky type diode is about 0.3 V, or higher. This voltage drop causes one of the greatest losses in a converter. If the voltage drop could be minimised by using a component having a much smaller voltage drop, the power converter would have a significantly higher efficiency. For instance, a MOSFET would reduce this voltage drop.

In the Swedish patent application No. 9804454-8 a continuous mode flyback converter having a synchronous switch is described. The control signal for the drive circuit of the secondary side synchronous switch is taken directly from a secondary or an auxiliary winding of the flyback transformer. The drive pulse goes to a secondary switch on the secondary side, which is generated by an inverting buffer circuit that is fed from the output voltage terminal. The pulse generating circuit generates a drive signal to the synchronous switch, which is independent of the input voltage. One disadvantage of this circuit is that in some conditions the timing of the secondary switch may be inappropriate.

SUMMARY

It is an object of the invention to overcome the problems indicated above.

It is another object of the invention to increase the efficiency of electrical DC converters in a flyback topology.

The objects are obtained by a circuit and a method for making synchronous rectification in a flyback converter. The converter is independent of the input voltage on the primary side, and there is no need for an auxiliary winding on the transformer.

Definition of terms used herein.

Flyback transformer: Either a choke, an auto-transformer or a full transformer. The primary winding of a flyback transformer refers to the winding through which the current flows during the forward phase of the converter, and the secondary winding refers to winding through which the current flows during the flyback phase.

Flyback phase: In a flyback converter, the flyback phase is when the primary side switch or main switch is an off-state, i.e. non-conducting, and the secondary side switch, rectifier switch, is an on-state, i.e. conducting. In a special case called a discontinuous mode, the secondary side switch may be turned off when the current through the switch equals zero.

Forward phase: In a flyback converter, the forward phase when the primary side switch is in the on-state, and the secondary side switch is in the off-state.

Discontinuous mode: A mode in a flyback converter, in which the magnetsing energy of the flyback transformer during some time of a switch cycle is equal to zero.

Continuous mode: A mode in a flyback converter, in which the magnetising energy of the flyback transformer during a switch cycle never goes to zero.

On-state: a conducting state for a switch.

Off-state: a non-conducting state for a switch.

Switch: An element having two distinct states, an on-state and an off-state.

Charged controlled circuit: A device which depends on charging of a control terminal, e.g. for a MOSFET, the gate terminal. Examples of charged controlled devices are MOSFETs and IGBTs.

The flyback converter has as conventional a primary side comprising a control device and a first element acting as a main switch. The converter also has a secondary side, comprising a drive circuit and a second element acting as a rectifying switch. The drive circuit has a turn-on part comprising a first transistor, a first diode between a base an emitter of the first transistor and a drive capacitor, which is connected to the control device. The drive circuit also has a turn-off part, comprising a second transistor, a second diode between a base and an emitter of the second transistor, and a second drive capacitor, which is connected to the control device.

Drive pulses from the control device at the primary control the flyback converter and are issued as follows:

At a turn-off signal, e.g. a negative flank of a drive pulse, the main switch is turned off. The turn-off signal also activates the turn-on part of the drive circuit so that the rectifying switch conducts.

At a turn-on signal, e.g. a positive flank of a drive pulse, the main switch is turned on. The turn-on signal also activates the turn-off part of the drive circuit so that the rectifying switch becomes non-conducting.

One advantage of the flyback converter as described herein is that it comprises few components.

Another advantage of the flyback converter is that the first and the second transistors on the secondary side cannot conduct simultaneously, although they are triggered by pulses from the same control device. This results from the fact that the first transistor is in an on-state only during the turn-off signals of the control signal, and that the turn-off transistor is in an on-state only during the turn-on signals. The rest of the time both the first and second transistors are in off-states.

Yet another advantage is that the voltage feed to the rectifying switch and the drive circuit does not vary with the input voltage or the output current of the flyback converter.

Another advantage is that the flyback converter prevents the main switch from conducting simultaneously with the rectifying switch.

A further advantage is the simple way of applying appropriate delays at the turn-on signal and in particular at the turnoff signal of the rectifying switch.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which.

FIGS. 2a–2d are timing charts,

DETAILED DESCRIPTION

Figure 1:
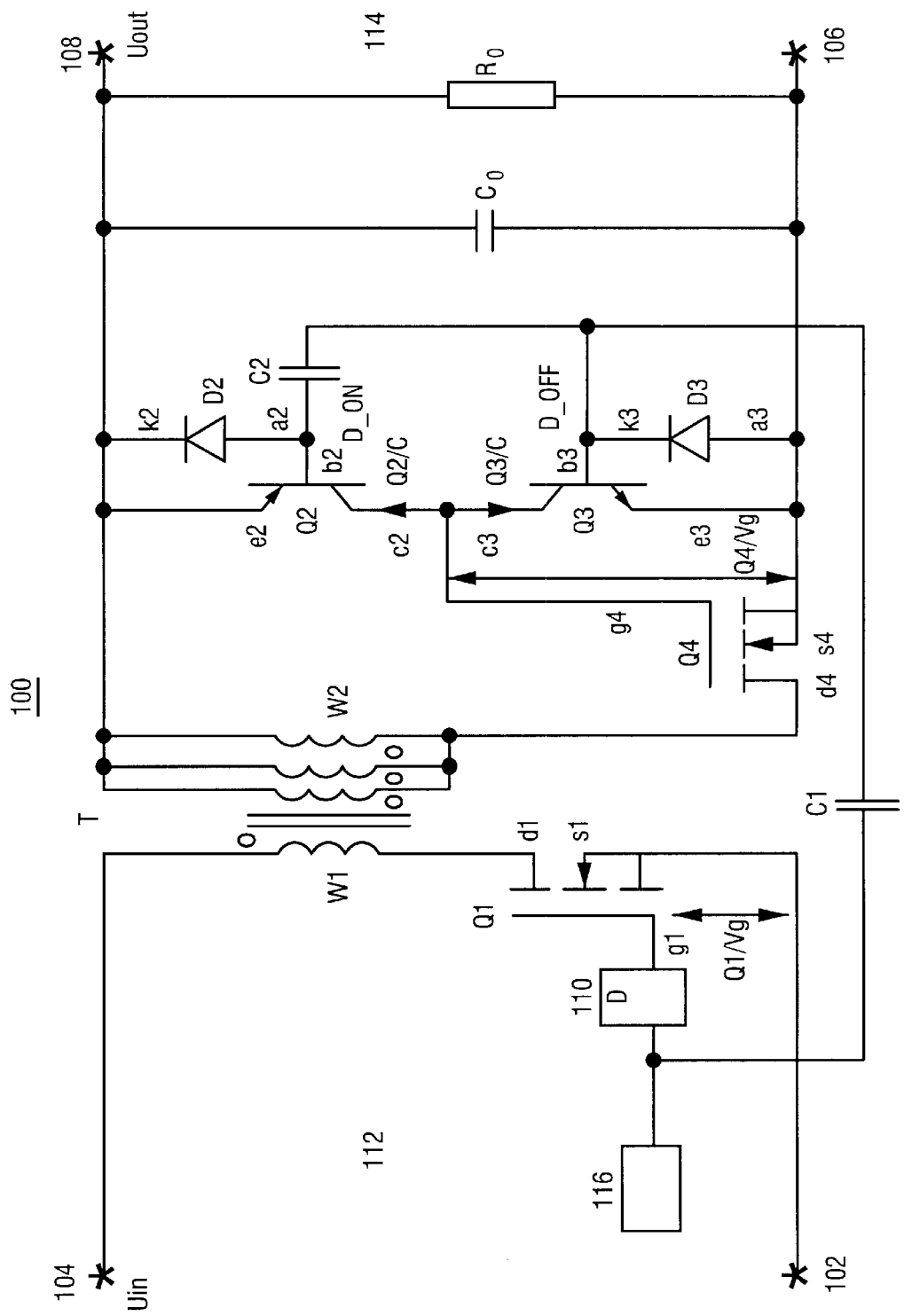
FIG. 1 is a circuit diagram of a DC-to-DC converter.

In FIG. 1, the circuit diagram of a flyback converter 100 is shown. On a primary side 112, the converter 100 comprises a primary winding W1 belonging to a transformer T, a main switch Q1, a control device 116 and a delay circuit 110. A first input terminal 104 of the primary side 112 is connected to one side of the primary winding W1 and is intended, when using the converter, to be connected to one terminal of some DC voltage source, not shown. The other side of the primary winding W1 is connected to a drain terminal d1 or similar connection point of the main switch Q1, which e.g. is an n-channel MOSFET transistor. A source terminal s1 or similar of the main switch Q1 is connected to a second input terminal 102 of the primary side 112 which thus, when using the converter, is to be connected to the other terminal of the external DC voltage source. An output terminal of the control device 116 is connected to a first capacitor terminal of a first drive capacitor C1. The control device 116 is also connected to an input of the time delay circuit 110, which in turn has its output terminal connected to a gate terminal g1 of the main switch Q1.

On a secondary side 114, the flyback converter 100 comprises a secondary winding W2 of die transformer T, transistors Q2 and Q3, a charge controlled rectifying switch Q4 and two diodes D2 and D3. The two sides, the primary and secondary sides 112, 114 of the converter, are coupled to each other by the transformer T and the first drive capacitor C1 and also by a second drive capacitor C2. One end of the secondary winding W2 is connected to a first output terminal 108 of the converter on which the desired is to be delivered. That first output terminal 108 is also connected to an emitter terminal e2 of one of the transistors, an on-transistor Q2, which can be PNP-type, and a cathode terminal k2 of one of the diodes, a discharge diode D2. An anode terminal a2 of the discharge diode D2 is connected to a base terminal b2 of the on-transistor Q2 at an on-connection node D_ON.

A collector terminal c2 of the on-transistor Q2 is connected to a collector terminal c3 of the other transistor, an off-transistor Q3, which can be NPN-type, and to a gate terminal g4 of the charge controlled rectifying switch Q4. The other end of the secondary winding W2 is connected to a drain terminal d4 of the rectifying switch Q4. A source terminal s4 of the rectifying switch Q4 is connected to a second output terminal 106 of the converter. An emitter terminal e3 of the off-transistor Q3 is connected to the second output terminal 106. An anode terminal a3 of the other one of the diodes, a diode D3, is also connected to the second output terminal 106, A cathode terminal k3 of this diode is connected to a base terminal b3 of the off-transistor Q3 at an off-connection node D_OFF.

The control device 116 controls switching of the main switch Q1 at the primary side 112 between on- and off-states at desired times, and of the rectifying switch Q4 on the secondary side 114 through the two drive capacitors C1 and C2 and transistors Q2, Q3. The off-connection node D_OFF is connected to the first drive capacitor C1, and the on-connection node D_ON is connected to the second drive capacitors C2. The second drive capacitor C2 is connected to the first drive capacitor C1, which in turn is connected to the control device 116, as already mentioned. The control device 116 can also, for example, collect control data from the output terminals of the secondary side 114 of the converter 100. Additional circuitry needed for this collection is not shown in the drawing.

The DC-voltage source to be connected to the input terminals 102, 104 can be replaced by an AC supply consisting of an AC source and a rectifying circuit.

The primary side 112 of the converter induces electrical voltage to the secondary side 114 via the transformer T.

The charge controlled rectifying switch Q4 located on the secondary side 114 is thus fed by a drive circuit, which receives information from the primary side 112 in the form of drive pulses issued by the control device 116. The drive circuit comprises two separate parts, a turn-on part and a turn-off part. The information is transferred to the secondary side 114 through the drive capacitors C1 and C2. Negative or positive flanks of the pulses from the control device 116 activate the two parts.

The turn-on part comprises the on-transistor Q2 and the discharge diode D2 connected between the base b2 and the emitter e2 of the on-transistor Q2. This part is activated when the control device 116 sends a turn-off signal, i.e. a negative flank of a signal, to the main switch Q1 and disables it, so that no current can pass between its source and drain. The negative flank also activates the drive circuit so that the rectifying switch Q4 is rendered conducting.

The turn-off part comprises the off-transistor Q3 and the discharge diode D3 connected between the base b3 and the emitter e3 of the off-transistor Q3. This part is activated when the control device 116 sends a turn-on signal, i.e. a positive flank of a pulse, to the main switch Q1 and enables it, so that current can pass between its source and drain. The positive flank also activates the driver circuit so that the rectifying switch Q4 is rendered nonconducting. The main switch Q1 will again be disabled when the control device 116 sends a turnoff signal. i.e. a pulse having a negative flank, and thus the process is repeated.

In order to prevent the two switches Q1 and Q4 from conducting at the same time the time delay circuit 110 is used, which is connected between the main switch Q1 and the control device 116. The time delay circuit 110 can have different delays at the negative and the positive flanks. The delay circuit 110 may comprise a simple circuit such as a series resistor that together with the gate or control terminal of the main switch Q1 acts as a delay circuit. The delay circuit 110 may also be more complex, so that the delays at turn on and turn off can be turned.

The transistors Q2 and Q3 may be replaced by other components, performing the same functions.

FIGS. 2a–2d are timing charts illustrating the operation of the flyback converter 100 as described above. The chart of FIG. 2a shows the signal Q1/Vg, i.e. the voltage of the gate electrode of the main switch Q1. The chart of FIG. 2d shows a converted signal Q4/Vg being the gate electrode of the rectifier switch Q4. The diagrams of FIGS. 2b and 2c show the collector currents Q2/Ic, Q3/Ic of the two transistors Q2 and Q3 respectively.

A conversion cycle 10 performed by the converter circuit 100 can be divided in four parts.

The first part I is part of the flyback phase 11 and occurs when the voltage Q1/Vg on the gate g1 of the main switch Q1 is low, see the diagram of FIG. 2a, as controlled by a negative flank of a control pulse. The main switch Q1 is then in an off-state, and the converter 100 is turned into the flyback phase. The negative flank of the drive pulse from the control device 116 influences via the capacitors C1 and C2 the on-transistor Q2 that starts to conduct for a short moment, as seen in the diagram of FIG. 2b. It is conducting during a time long enough for the gate g4 of the rectifying switch Q4 to go high, see the diagram of FIG. 2d, and to charge and turn on the rectifying switch Q4. The rectifying switch Q4 will conduct through the whole flyback phase.

The second part II is also part of the flyback phase 11 and occurs when the main switch Q1 still is in the off-state. The rectifying switch Q4 is in the on-state, and the transistors Q2 and Q3 are off and inactive.

The third part III is part of the forward phase 12 and occurs, when the control device 116 sends a positive flank to the gate g1 of the main switch Q1, and the converter 100 turns into the forward phase. The positive flank of the drive pulse influences via the capacitor C1 the off-transistor Q3 that starts to conduct for a short moment. It is conducting during a time long enough for the gate g4 of the rectifying switch Q4 to discharge and turn off the rectified switch.

The fourth part IV is also part of the forward phase 12 and occurs when the main switch Q1 is on, the rectifying switch Q4 is off and the transistors Q2 and Q3 are off.

In a second embodiment, not shown, the first drive capacitor C1 is connected between the control device 116 and the on-connection node D_ON and the second drive capacitor C2 is connected between the on-connection node D_ON and the off-connection node D_OFF. The component values of the two capacitors are preferably different from those used in the first embodiment.

In a third embodiment, not shown, the first drive capacitor C1 is connected between the control device 116 and the off-connection node D_OFF and the second drive capacitor C2 is connected between the control device 116 and the on-connection node D_ON. The component values of the two capacitors are preferably different from those used in the first and second embodiment.

In these second and third embodiments, the function of the flyback converter 100 is substantially identical to that of the first embodiment.

The invention is not limited to the implementation described in conjunction with to FIGS. 1, 2a, 2b, 2c, and 2d can easily be modified without deviating from the scope of the appended claims.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A flyback converter comprising:
   a primary side including a main switch, a control device, and a delay circuit, and
   a secondary side including a drive circuit and a rectifying switch, the drive circuit including:
      a turn-on part arranged to be activated when the main switch is turned-off to make the rectifying switch conducting, and
      a turn-off part arranged to be activated when the main switch is turned-on to make the rectifying switch non-conducting, the turn-on part including:
         a first transistor and a first discharge diode coupled between a base and an emitter of the first transistor, wherein the control device is coupled to the base of the first transistor via a drive capacitor.

2. The flyback converter of claim 1, wherein the first transistor is a PNP-transistor.

3. The flyback converter of claim 1, wherein the turn-off part includes a second transistor, a second discharge diode coupled between a base and an emitter of the second transistor, and the drive capacitor coupled to the base of the second transistor.

4. The flyback converter of claim 1, wherein the second transistor is an NPN-transistor.

5. The flyback converter of claim 1, wherein the main switch includes a MOSFET.

6. The flyback converter of claim 1, wherein the rectifying switch is a charge controlled component.

7. The flyback converter of claim 1, wherein the rectifying element comprises an MOSFET or an IGBT.

8. The flyback converter of claim 1, wherein the delay circuit is coupled between the main switch and the control device, and the drive capacitor is coupled to the control device.

9. A flyback converter comprising:

a primary side including a main switch, a control device, and a delay circuit, and a secondary side including a drive circuit and a rectifying switch, wherein the control device is coupled by a main switch control line to the main switch, the main switch control line includes the delay circuit, and the control device is configured to issue control pulses transmitted on the main switch control line through the delay circuit to the main switch and on a drive circuit control line transmitted to the drive circuit, wherein the drive circuit includes a turn-on part arranged to be activated when the main switch is turned-off to make the rectifying switch conducting and a turn-off part arranged to be activated when the main switch is turned-on to make the rectifying switch non-conducting, and wherein the drive circuit control line includes at least one drive capacitor coupled at one end to a control terminal of one of the turn-on and turn-off parts.

* * * * *